US010261305B2

(12) United States Patent
Wenger et al.

(10) Patent No.: US 10,261,305 B2
(45) Date of Patent: Apr. 16, 2019

(54) THREE-DIMENSIONAL FOCUSING DEVICE AND METHOD FOR A MICROSCOPE

(71) Applicants: Université d'Aix-Marseille, Marseilles (FR); Centre National de la Recherche Scientifique, Paris (FR)

(72) Inventors: Jérôme Wenger, Vitrolles (FR); Pierre Dominique Bon, Palaiseau (FR); Serge Olivier Pierre Monneret, Marseilles (FR)

(73) Assignees: Centre National de la Recherche Scientifique, Paris (FR); Université Aix-Marseille, Marseilles (FR)

( * ) Notice: Subject to any disclaimer, the term of this patent is extended or adjusted under 35 U.S.C. 154(b) by 188 days.

(21) Appl. No.: 15/036,622

(22) PCT Filed: Oct. 31, 2014

(86) PCT No.: PCT/EP2014/073446
§ 371 (c)(1),
(2) Date: Aug. 3, 2016

(87) PCT Pub. No.: WO2015/071116
PCT Pub. Date: May 21, 2015

(65) Prior Publication Data
US 2016/0341946 A1 Nov. 24, 2016

(30) Foreign Application Priority Data

Nov. 13, 2013 (FR) ...................................... 13 61065
Jun. 30, 2014 (FR) ...................................... 14 56113

(51) Int. Cl.
*H04N 13/00* (2018.01)
*G02B 21/36* (2006.01)
(Continued)

(52) U.S. Cl.
CPC ......... *G02B 21/365* (2013.01); *G02B 21/245* (2013.01); *G02B 21/26* (2013.01);
(Continued)

(58) Field of Classification Search
USPC .................................... 348/79, 61, 42, 45, 68
See application file for complete search history.

(56) References Cited

U.S. PATENT DOCUMENTS 7,570,791 B2 * 8/2009 Frank .................. A61B 6/4441
382/128
8,237,797 B2 * 8/2012 Hayashi ............... G02B 21/365
348/130
(Continued)

FOREIGN PATENT DOCUMENTS

DE    102011003807 A1   8/2012
WO    2013010859 A1    1/2013
WO    2013015143 A1    1/2013

OTHER PUBLICATIONS

International Search Report issued in corresponding application No. PCT/EP2014/073446 dated Feb. 16, 2015 (6 pages).
(Continued)

*Primary Examiner* — Daquan Zhao
(74) *Attorney, Agent, or Firm* — Osha Liang LLP

(57) ABSTRACT

The invention relates to a device (II) for three-dimensional focusing in a microscope (I) with a given resolution, comprising: —a detector (119) making it possible to determine, in a given measuring plane, a phase and intensity image of an electromagnetic field resulting from the interaction of an incident light wave with a reference object (105) situated in a reference medium with a given index and having a complex refractive index, the real part and/or the imaginary part of which differs from the real part and/or the imaginary part, respectively, of the refractive index of the reference medium; —computation means (121) making it possible to
(Continued)

determine a three-dimensional position variation of the reference object (105) from at least one phase and intensity image.

16 Claims, 9 Drawing Sheets

(51) Int. Cl.
- *G02B 21/24* (2006.01)
- *G02B 21/26* (2006.01)
- *H04N 5/225* (2006.01)
- *H04N 5/232* (2006.01)
- *H04N 17/00* (2006.01)
- *A61B 1/06* (2006.01)
- *A61B 1/04* (2006.01)

(52) U.S. Cl.
CPC ......... *G02B 21/361* (2013.01); *H04N 5/2256* (2013.01); *H04N 5/23212* (2013.01); *H04N 17/002* (2013.01)

(56) References Cited

U.S. PATENT DOCUMENTS

| | | | |
|---|---|---|---|
| 9,507,134 B2 | 11/2016 | Levecq et al. | |
| 2007/0114371 A1* | 5/2007 | Fukuchi | G02B 21/32 250/251 |
| 2009/0147355 A1* | 6/2009 | Jennings | G02B 21/26 359/391 |
| 2011/0249866 A1* | 10/2011 | Piestun | H04N 13/0203 382/103 |
| 2011/0267600 A1* | 11/2011 | Ouchi | G01N 21/3581 356/51 |
| 2012/0154801 A1* | 6/2012 | Carron | G01J 3/0208 356/301 |
| 2012/0162733 A1* | 6/2012 | Ferraro | G03H 1/0866 359/9 |
| 2012/0194903 A1* | 8/2012 | Nishikawa | G02B 21/245 359/363 |
| 2012/0300293 A1* | 11/2012 | Selvin | G02B 21/16 359/385 |
| 2013/0027518 A1* | 1/2013 | MacKay | G02B 21/26 348/46 |
| 2013/0229663 A1* | 9/2013 | Yang | A61B 5/0062 356/497 |
| 2015/0043006 A1* | 2/2015 | de Groot | G01B 9/0209 356/497 |
| 2015/0268628 A1* | 9/2015 | Sato | G03H 1/0443 356/457 |
| 2015/0309300 A1* | 10/2015 | Higaki | G02B 21/14 348/79 |

OTHER PUBLICATIONS

Written Opinion of the International Searching Authority issued in corresponding application No. PCT/EP2014/073446 dated Feb. 16, 2015 (11 pages).

Office Action issued in the counterpart Japanese Patent Application No. 2016-530956, dated Oct. 2, 2018 (4 pages).

* cited by examiner

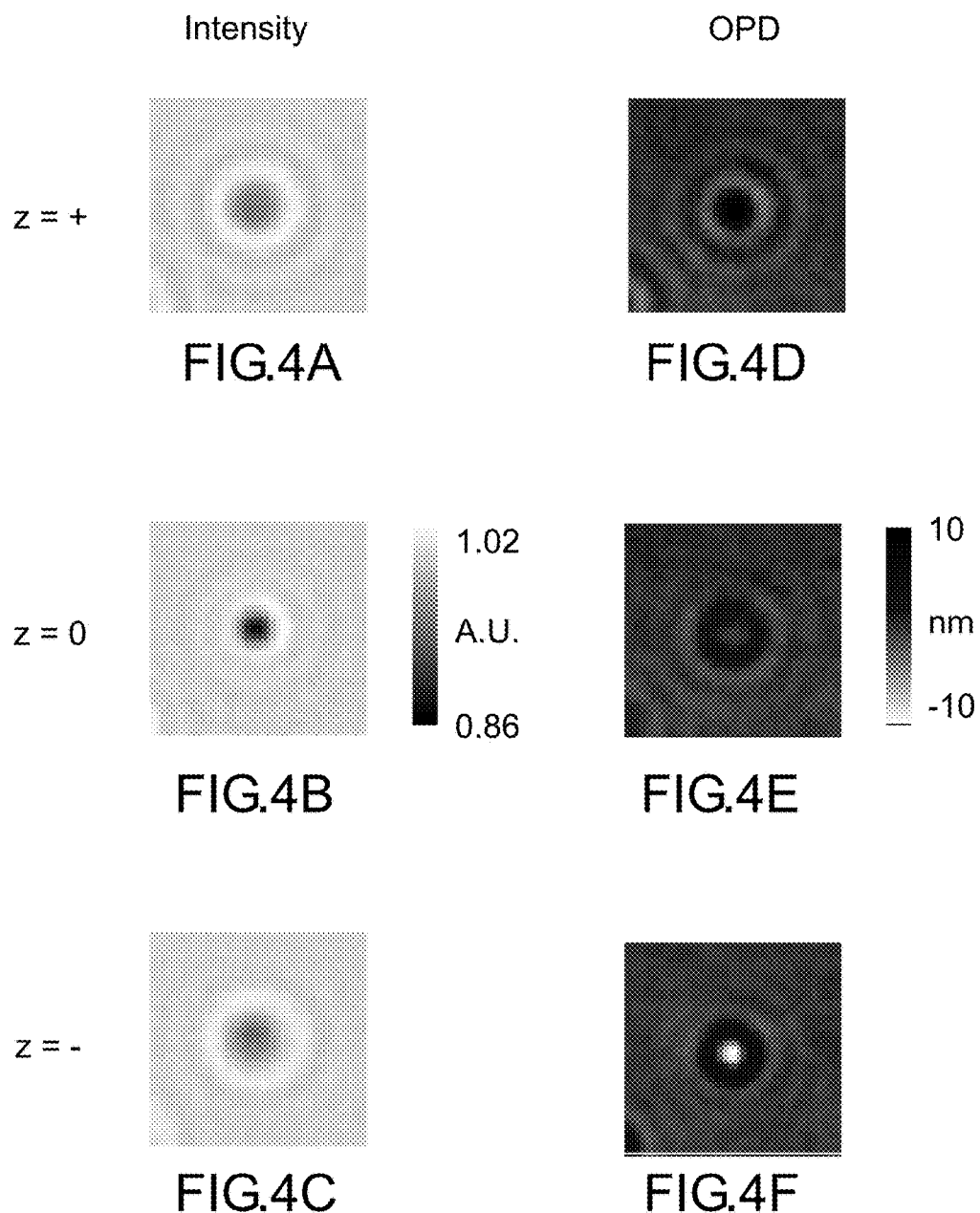

THREE-DIMENSIONAL FOCUSING DEVICE AND METHOD FOR A MICROSCOPE

PRIOR ART

Technical Field of the Invention

The present invention relates to a device and method for three-dimensional focusing for a microscope.

Prior Art

Recent developments in biological imaging have pushed back the limits of existing microscopes. It is currently possible by virtue of ultra-resolution optical microscopes such as PALM or STORM microscopes to achieve a locational resolution for observed molecules beyond the diffraction limit. Nevertheless, instabilities inherent to microscopes lead the position of the imaged specimen to drift, thereby compromising the precision and exactitude of the imaging. These drifts may be related to acoustic and mechanical vibrations resulting from the environment and to temperature variations, and may take place in three directions. In addition, the data acquisition times obtained for example with a PALM microscope may be long, sometimes several hours, thereby increasing the requirement in terms of stability of the microscope. In this context, it is therefore sought to maintain the focus on the specimen in three dimensions with a very good temporal and spatial resolution.

Various types of methods for three-dimensional focusing have been proposed in microscopy. One of these methods, commonly used in optical microscopy, consists in injecting a light beam issued from an IR LED source into the microscope, then in measuring the signal reflected by the lamella of the specimen (see for example Zemek et al., "CRISP nearly eliminates microscopy focus drift", LASER FOCUS WORLD, 48(9), 9-10, 2012). Although these systems are commonly used, the precision obtained for the focus along the optical axis does not exceed 50 nm.

With the aim of obtaining a better precision, other techniques exist using micron-sized markers in the field of view of the microscope.

For example, patent application US2013027518 describes, in one embodiment, an autofocus device for a microscope in which a light source illuminates a specimen and a reference element. The reference element serves as a marker and is held on the holder of the specimen. The drift in the position of the specimen along the Z axis (optical axis of the microscope objective) is then corrected by virtue of a measurement of the variation of a transverse dimension of the image of the reference element, the variation in the transverse dimension corresponding to a measurement of the absolute value of the variation in the axial position of the reference object. Although this device allows a precision of about 20 nanometers to be obtained, it requires closed-feedback-loop control of the stage to adjust the position and evaluate the direction of the variation in the axial position of the reference object.

Another example for evaluating and therefore mitigating the drifts in the position of a specimen observed under a microscope is described in patent application US2012300293. The latter relates to the measurement of the intensity of light diffracted by markers of 300 nm to 4 µm in size arranged to form a two-dimensional grating and located on a holder of a specimen to be observed. This technique allows theoretical precisions of about a few tens of nanometers to be obtained but requires a two-dimensional microscopic grating to be manufactured.

The present invention provides a device and method for three-dimensional focusing for a microscope especially allowing automatic three-dimensional focusing with a single measurement and with a resolution lower than 10 nm.

SUMMARY OF THE INVENTION

According to a first aspect, the invention relates to a device for three-dimensional focusing in a microscope of given resolution especially comprising a detector for detecting the phase and intensity of an electromagnetic field and calculating means.

More precisely, the detector allows, in a given measurement plane, a phase and intensity image of an electromagnetic field resulting from the interaction of an incident light wave with a reference object located in a reference medium of given index and having a complex refractive index the real part and/or imaginary part of which is different, respectively, from the real part and/or imaginary part of the refractive index of the reference medium, to be determined.

The calculating means allow, from at least one phase and intensity image, a variation in the three-dimensional position of the reference object to be determined.

To implement the device, the chosen reference object is united with a specimen holder of the microscope; more precisely, the reference object may be immobile relative to the specimen holder or have a known movement relative to the specimen holder or even have a movement smaller than or equal to a desired focal precision.

The Applicants have shown that it is possible, from simultaneous analysis in a given detection plane of phase and intensity images of the electromagnetic field resulting from the interaction with the reference object, to very precisely determine both the axial and lateral variations in the reference object, and therefore the drifts of the microscope.

Such a device may be easily integrated into a conventional microscope.

According to one embodiment, the light wave that interacts with the reference object may be emitted by the light source of the microscope.

According to one embodiment of the invention, the device comprises a specific emitting source for emitting a beam for illuminating the reference object. Such a device allows the characteristics of the source for emitting the beam for illuminating the reference object to be chosen independently from the light source of the microscope.

According to one embodiment of the invention, the dimensions of the reference object chosen for the implementation of the device are comprised between 0.1 and 2 times the resolution of the microscope. Specifically, although the interaction is possible between the incident light wave and the reference object whatever the size of the reference object, a stronger interaction is obtained with reference objects of small dimensions, thereby allowing the precision of the measurement to be increased. The dimensions of the reference object must be sufficiently large however for the formation of the images of the reference object not to be limited by the resolution of the video camera.

According to one embodiment, the reference object may form part of the specimen; it is for example a question of a reference object that is intrinsic or endogenous to the specimen. Thus, the element serving as reference object is already present in the specimen.

According to another embodiment, the reference object is an element external to the specimen, intended to be positioned in a reference medium of given index.

For example, the reference object comprises a particle made of a metal or a dielectric respectively having a real part of the refractive index or an imaginary part of the refractive index that is different from the real part or imaginary part of the refractive index of the reference medium. This difference is advantageously larger than or equal to 0.1 and advantageously larger than or equal to 0.5. Favorably, the use of this type of material allows highly contrasted dependences of the phase and intensity as a function of the position of the reference object, resulting from stronger interactions between the incident light wave and the reference object, to be observed.

According to one embodiment of the invention, the two-dimensional phase and intensity detector comprises a modified Hartmann mask allowing the intensity and phase of an electromagnetic field to be simultaneously measured.

According to a second aspect, the invention relates to a microscope comprising a specimen holder, a source for emitting an illuminating beam, a microscope objective, a device for three-dimensional focusing according to the present description, and means for moving relatively the specimen holder and the microscope objective in three dimensions.

According to one embodiment of the invention, the device comprises controlling means for transmitting to the moving means of the microscope the calculated variation in the three-dimensional position of the reference object, allowing the microscope to be automatically focused.

According to a third aspect, the invention relates to a method for three-dimensional focusing in a microscope, comprising:
  choosing a reference object in a reference medium of given index, said reference object being united with a specimen holder and having a complex refractive index the real part and/or imaginary part of which is different, respectively, from the real part and/or imaginary part of the refractive index of the reference medium;
  illuminating the reference object with an incident light wave;
  acquiring a phase and intensity image, in a given measurement plane, of an electromagnetic field resulting from the interaction of the incident wave with the reference object;
  determining, from at least one phase and intensity image, a variation in the three-dimensional position of the reference object.

According to one embodiment, the chosen reference object forms part of the specimen; the reference object is for example intrinsic to the specimen.

According to one embodiment, the reference object is an object external to the specimen and the method for three-dimensional focusing comprises positioning the reference object in the reference medium.

According to one embodiment of the invention, the focusing method comprises a prior calibrating step, the calibrating step comprising determining, for a series of axial positions of the reference object, the intensity and phase at a given point of the measurement plane.

The calibration thus allows the electromagnetic field resulting from the interaction between the incident wave and the reference object to be characterized, for example by means of charts giving the phase and intensity as a function of the axial position of the reference object, and the application of the method for three-dimensional focusing to be facilitated. The acquisition of an image or of a series of images in a single measurement plane is enough during operation to very precisely determine the value and the direction of the axial variation of the reference object, the lateral variation being determinable from the phase or intensity image.

According to one embodiment of the invention, the calibrating step comprises calculating phase and intensity images for various axial positions of the reference object using a propagation algorithm, allowing charts to be drawn up without prior measurement, by simulation of the form of the electromagnetic field resulting from the interaction between the incident light wave and the reference object, the characteristics of which are known.

According to one embodiment of the invention, the calculation of phase and intensity images during the calibration is based on at least one image of the reference object, which image is acquired beforehand, allowing the charts to be deduced therefrom without knowing all the characteristics of the reference object, of the reference medium and of the emitting source.

According to one embodiment of the invention, the method for three-dimensional focusing furthermore comprises a step of transmitting to moving means etc. the calculated variation in the three-dimensional position of the reference object, allowing automatic focusing to be achieved.

BRIEF DESCRIPTION OF THE DRAWINGS

Other advantages and features of the invention will become apparent on reading the description, which is illustrated by the following figures:

FIGS. 4A to 4F, exemplary phase and intensity images of an electromagnetic field resulting from the interaction of an incident wave with a reference object formed from a metal particle at various axial positions of the reference object;

DETAILED DESCRIPTION

In the figures, identical elements are indicated by the same references.

Figure 1A:
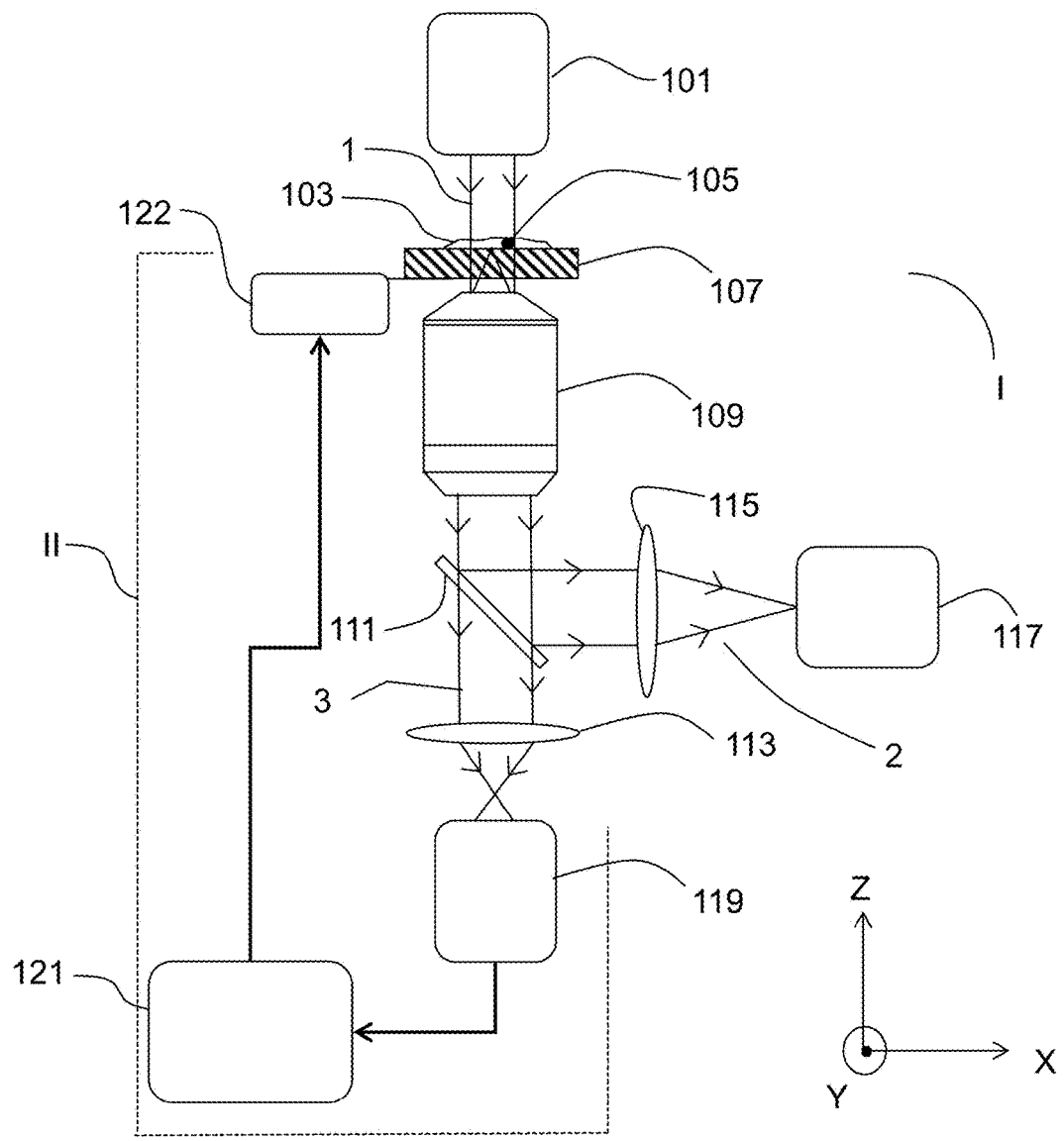
FIG. 1A, a schematic illustrating a microscope equipped with a device for three-dimensional focusing operating in transmission, according to one exemplary embodiment.

FIG. 1A illustrates an example of a microscope I integrating a device II for three-dimensional focusing according to one embodiment of the invention implementing illumination in transmission.

As illustrated in the example in FIG. 1A, the microscope comprises an illumination channel 1 and a first detection channel 2. The illumination channel 1 comprises a source 101 for emitting a collimated and uniform illuminating beam, such as a coherent light source, for example a Köhler illumination allowing homogeneous illumination of a specimen 103 placed on a specimen holder 107 to be obtained. The emitting source is for example a monochromatic source. The detection channel 2 is intended to form an image of a zone of interest of the specimen on a detection surface of a matrix-array detector 117, for example a CCD video camera or an amplified video camera of the electron multiplying charge-coupled device (EMCCD) type. The first detection channel 2 comprises a microscope objective 109 intended for example to work in a focal-point/infinity working optical configuration, i.e. such that, in the optimal working configuration, the beam emitted by a specimen 103 at the center of the object field ("working plane") of the microscope objective is a collimated beam on exiting the microscope objective 109. The first detection channel also comprises optical elements allowing image formation on the detection surface, the optical elements for example comprising an optical objective imaging system 115 and optionally deflecting means 111. The microscope furthermore comprises means 122 for moving relatively the specimen holder 107 and the microscope objective 109, for adjusting the focus on the zone of interest of the specimen. In the example in FIG. 1, the moving means for example comprise a motorized stage, for example a piezoelectric stage, allowing the specimen holder 107 to be moved in a lateral XY plane perpendicular to the optical axis of the microscope objective and along the Z axis parallel to the optical axis of the microscope objective.

Such a microscope is conventionally characterized by a "resolution" that is proportional to the ratio of the central wavelength of the spectral band of the illuminating source 101 to the numerical aperture of the microscope objective 109.

As illustrated in the example in FIG. 1A, the microscope I furthermore comprises a device II for three-dimensional focusing.

The device II for three-dimensional focusing comprises, in the example in FIG. 1, a reference object 105 intended to be positioned in a reference medium of given index, the reference object being united with the specimen holder 107. Alternatively, the reference object may form part of the specimen, as will be described in more detail below.

The device II for three-dimensional focusing moreover comprises a detector 119 allowing, in a given measurement plane, a phase and intensity image of an electromagnetic field resulting from the interaction of an incident wave with the reference object to be determined, and calculating means 121 allowing, from at least one phase and intensity image of said electromagnetic field, a variation in the three-dimensional position of the reference object to be determined. These calculating means may be connected to means for controlling the stage 122 in order to control the relative movement between the microscope objective and the specimen holder and thus for example to ensure an automatic focus.

In the example in FIG. 1A, the incident wave is issued from the illuminating source 101 of the microscope. However, the three-dimensional focusing device may also comprise a specific source as will be described below.

The measurement plane is advantageously substantially coincident with a plane located in the vicinity of the conjugate plane of the reference object 105 in order to maximize the sensitivity of the device, when the device II for three-dimensional focusing is integrated into the microscope I. Thus, in the example in FIG. 1, the microscope I comprises a second detection channel 3 for the three-dimensional focusing, the second detection channel 3 comprising, in the example in FIG. 1, the microscope objective 109, which is common with the detection channel 2 of the microscope, and an objective 113.

Figure 1B:
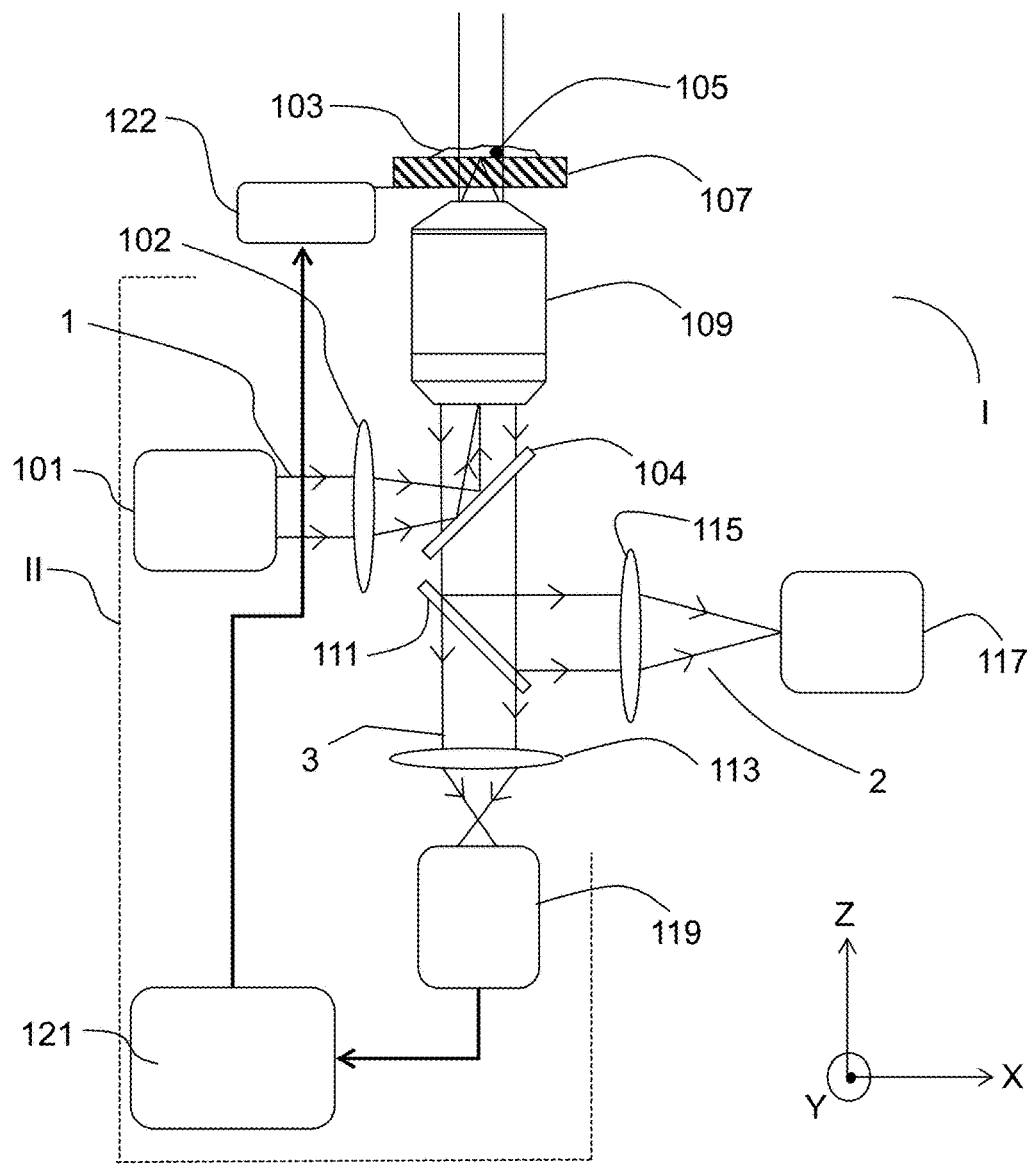
FIG. 1B, a schematic illustrating a microscope equipped with a device for three-dimensional focusing operating in reflection, according to one exemplary embodiment of the invention.

According to one embodiment of the invention, illustrated in FIG. 1B, the illumination of the specimen is in reflection. The illuminating beam is in this example reflected by a plate 104, for example a dichroic plate or a semi-reflective plate making it possible to let the collected rays pass to the objective. Once again, the emitting source may form part of the microscope device or of the focusing device independently of the microscope device.

According to the present description, the reference object chosen for implementation of the three-dimensional focusing has a complex refractive index the real part and/or imaginary part of which is different, respectively, from the real part and/or imaginary part of the refractive index of the reference medium, in such a way as to modify the electromagnetic field of the incident wave that interacts with the reference object. In the case where the reference object is an element external to the specimen, the latter may for example be made of a metal with an imaginary part of the complex index predominating, or be made of a dielectric with a real part of the complex index predominating.

By reference medium, what is meant in the present description is any medium making contact with the reference object. This medium may especially be the specimen to be observed itself, a substrate of a specimen holder, the surrounding air or gas.

Advantageously, the variation in the real or imaginary index between the reference medium and the reference object is larger than or equal to 0.1.

According to one embodiment, the reference object may form part of the specimen; more precisely, it may be a question of an element that is intrinsic or "inherent" to the specimen. In any case, the element of the specimen chosen as reference object respectively has a real part of the refractive index or an imaginary part of the refractive index that is different from the real part or the imaginary part of the refractive index of the reference medium. According to this embodiment, the reference object may especially be a part of a cell such as an organelle, a vesicle, a nucleus or a nucleole, or a cell in its entirety, such as a bacterium, or a piece of debris or a residue present in the specimen. In the case where the reference object is in the interior of the specimen, it is possible to consider the latter to be united with the specimen holder if its theoretical movement relative to the structures of interest (i.e. those observed by the user and requiring a 3D autofocus) is known, or if its movement during the measurement time is smaller than or equal to a desired focal precision, typically 1/10 of the resolution of the microscope. Nevertheless, preferentially, according to this embodiment, the reference object is immobile in the frame of reference of the microscope; this case is commonly encountered in the study of biological specimens, when the latter are studied after having undergone what is called a fixation protocol.

In the case of a reference object defined as an element intrinsic to the specimen, the latter may be chosen and identified as a "reference object" by virtue of a phase or intensity image of the specimen, depending on whether the object shifts phase more or is more absorbent than its surrounding medium, respectively.

Figure 2A:
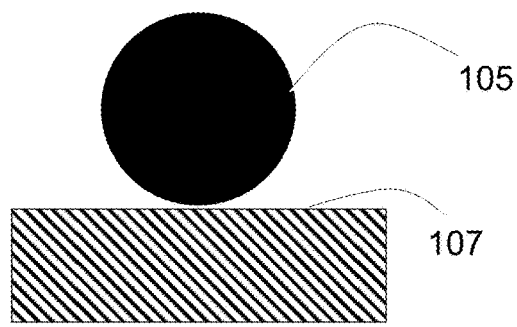
FIGS. 2A to 2C, schematics illustrating exemplary reference objects for a focusing device according to the present description.
Figure 2B:
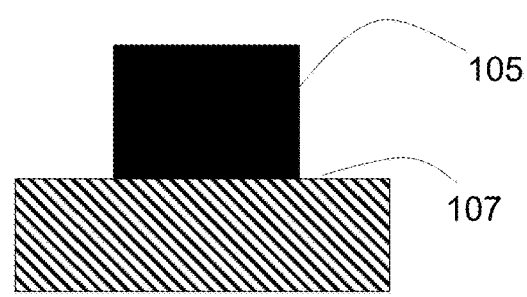
Figure 2C:
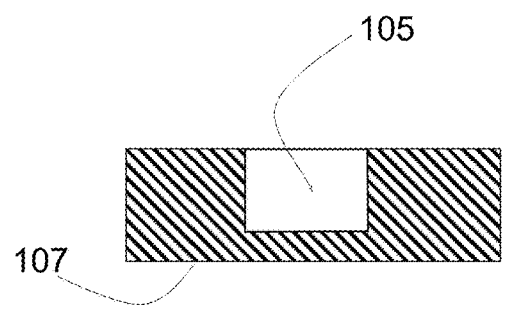
Figure 3A:
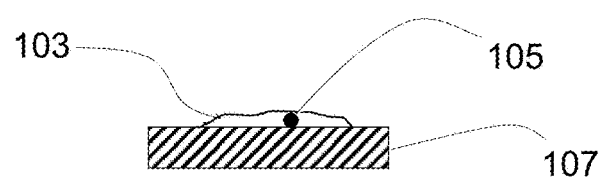
FIGS. 3A to 3D, schematics illustrating various positional configurations of the reference object relative to the specimen holder.
Figure 3B:
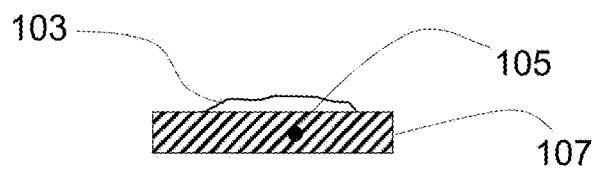
Figure 3C:
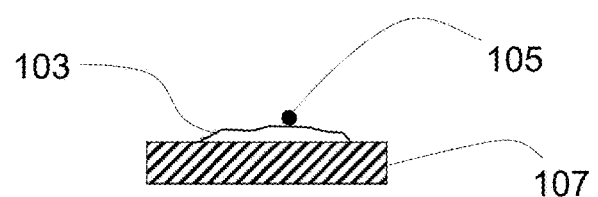
Figure 3D:
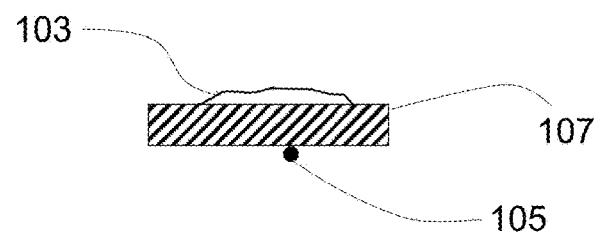

FIGS. 2A to 2C illustrate various reference-object embodiments in the case of a reference object external to the specimen. The reference object is for example a particle or a set of particles deposited on a substrate of a specimen holder 107 (FIG. 2A), a pad or a set of pads formed by lithography on a substrate of a specimen holder (FIG. 2B), or an engraving or a set of engravings produced in the specimen holder itself, the cavities thus formed possibly being filled with a liquid of given index (FIG. 2C). According to one embodiment, the reference object may comprise a combination of these various elements. Such as presented in the examples in FIGS. 3A to 3D, the reference objects may be positioned on the upper surface of the substrate of the specimen holder (specimen side—FIG. 3A), on the lower surface of the substrate (objective side—FIG. 3D), in the bulk of the substrate (FIG. 3B), or fastened directly to the sample (FIG. 3C).

There may be any number (≥1) of reference objects, which may be internal or external to the sample and placed randomly or regularly, thereby especially allowing the sensitivity of the focusing device to be increased.

The device for three-dimensional focusing according to the present description is based on the analysis of the variation in the phase and intensity of the electromagnetic field resulting from the interaction between the incident wave and the reference object placed in the field of observation of the sample. Specifically, the Applicants have demonstrated that simultaneous analysis, in a given detection plane, of phase and intensity images of the electromagnetic field resulting from the interaction with the reference object allows, very precisely, the axial and lateral variations in the reference object, and therefore the drifts of the microscope, to be determined. The interaction between the incident wave and the reference object may consist in various physical effects, for example scattering or absorption effects, depending on the nature of the reference object, these effects possibly being resonant in certain cases that will be described in more detail below.

To obtain a strong interaction between the reference object and the illuminating wave, it is advantageous for the elements forming the reference object (for example particles, pads, engravings, etc.) to have dimensions of the order of the resolution of the microscope. Advantageously, the average sizes of the elements forming the reference object are comprised between 0.1 and 2 times the resolution of the microscope and advantageously between 0.5 and 1 times the resolution of the microscope. Thus, for a microscope objective having a numerical aperture between 0.5 and 1.3 and an illuminating source emitting at an illuminating wavelength comprised between 500 and 800 nm, the dimensions of the reference object (or of the elements forming the reference object) are comprised between 40 nm and 3 µm.

The phase and intensity images are for example detected by means of a two-dimensional detector 119 but it may also be a question of a one-dimensional or point detector combined with a scanning system.

Advantageously, the detector 119 allows phase and intensity to be simultaneously analyzed. It is for example a question of a multilateral shearing interferometric device using a modified Hartmann mask, for example employing a superposition of an amplitude grating of given period p and a phase grating of period 2.p, for example an SID4 detector from the company Phasics®, allowing a map of a wavefront to be drawn simultaneously in phase and intensity (P. Bon et al., Opt. Express 17, 13080 (2009)). Other devices allow the phase map of the wavefront to be drawn and will possibly be combined with an intensity detector for the simultaneous analysis of phase and intensity. The wavefront analyzers may for example and nonlimitingly comprise a wavefront curvature sensor, a Shack-Hartmann sensor, or a quantitative phase microscopy setup, for example a digital holography device with a Mach-Zehnder or Michelson setup).

FIG. 4 shows exemplary intensity (FIG. 4A, FIG. 4B, FIG. 4C) and phase (FIG. 4D, FIG. 4E, FIG. 4F) images acquired by a two-dimensional Phasics® detector, the measurement plane being conjugate with the working plane of the microscope objective.

More precisely, these images are obtained with a reference object comprising a metal particle made of gold of 150 nm diameter, placed so as to be united with the specimen holder, and illuminated by an illuminating wave of 670 nm wavelength, at various relative positions of the particle with respect to the working plane of the microscope objective. The position denoted z=0 corresponds to the focal position, in which the reference object is in the working plane of the microscope objective, conjugate with the measurement plane of the phase and intensity detector. The positions z+ and z− correspond to positions of the reference object that are shifted along the optical axis of the microscope objective, on either side of the position z=0. More precisely, the position z+ corresponds to an increased distance between the reference object and the microscope objective and the position z− to a decreased distance. The images called "phase" images show a phase difference relative to a reference phase, and more precisely an optical path difference or "optical phase difference" (OPD) relative to a reference optical path calculated in a zone far from the reference object, for example at the edge of the observation field, when the metal particle is at z=0. Furthermore, even though in the present application only the intensity of the electromagnetic field is considered, it will be clear to a person skilled in the art that the images referred to as "intensity" images may equally well be in amplitude, the amplitude of the electromagnetic field being usable in the propagation calculations for example.

In FIG. 4, intensity is shown in arbitrary units (A.U.) whereas optical path difference is shown in nm. The intensity images in FIGS. 4A, 4B, 4C show, at the center of the field (corresponding to the center of the particle) an intensity minimum at z=0 (FIG. 4B), the intensity increasing on either side of the focal position (FIGS. 4A and 4C). In the phase images, it may be seen that in the center of the field the phase difference is zero at the focal point (FIG. 4E), this point being taken as the reference point for the phase, and that on either side of the focal position the phase difference at the center of the field is respectively positive (FIG. 4D at z+) and negative (FIG. 4F at z−).

Figure 5A:
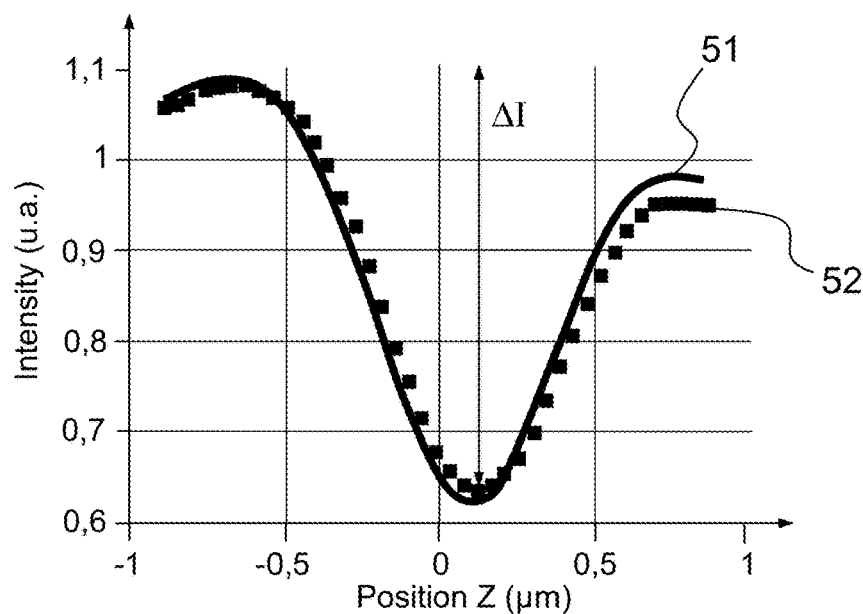
FIGS. 5A and 5B, examples of graphs, obtained experimentally and numerically, respectively representing the intensity and phase of an electromagnetic field resulting from the interaction between an incident wave and a reference object formed from a metal particle, as a function of the axial position of the reference object.
Figure 5B:
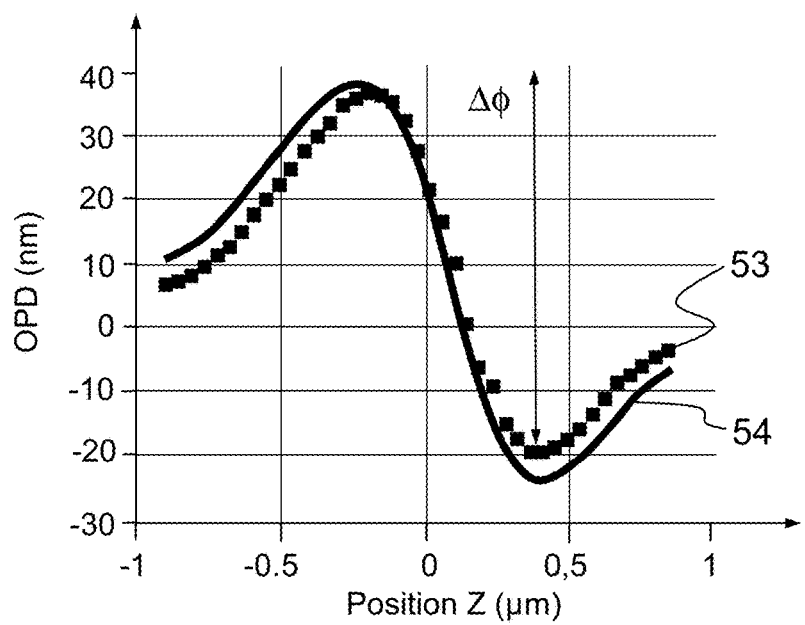

FIGS. 5A and 5B thus illustrate (curves 51 and 53, respectively), the intensity and phase (or more precisely the optical path difference OPD) measured from images such as shown in FIG. 4, as a function of the z-axial shift of the reference object with respect to the focal position z=0. These curves are obtained under the same experimental conditions as those in FIG. 4 (particle made of gold of 150 nm diameter and illuminating wavelength of 670 nm).

These curves show the even behavior of the intensity function and uneven behavior of the phase function of the electromagnetic field resulting from the interaction of the incident wave and the metal reference object measured at the centre of the field, as a function of the axial position of the particle. It may be seen that at the focal position (z=0), the intensity is minimal and the slope of the phase is maximal. Thus, in the example in FIG. 5B, the slope is −98.2 nm×μm$^{-1}$ at the position z=0. The phase and intensity variations such as illustrated may be exploited to determine very precisely the variation in the axial movement of the particle, as will be described in more detail below. Specifically, since it is known that the sensitivity of a phase measurement is $$\frac{1}{\sqrt{N}}$$

nm where N is the number of measurements averaged, it is possible to roughly estimate the axial location precision of a focal position as $$\Delta z = \frac{1 \text{ nm}}{\sqrt{N}} \times \frac{1}{98.2 \text{ nm} \cdot \mu m^{-1}} \approx \frac{10 \text{ nm}}{2N}$$

namely about 1 nm for 10 averaged measurements. This precision is well below the size of the particle.

FIGS. 5A and 5B also show curves 52 and 54 calculated by applying a numerical propagation algorithm to a pair of intensity/phase images taken at a given position of the z axis, advantageously at the focal position.

The algorithm used is an electromagnetic field numerical propagation algorithm. An electromagnetic field numerical propagation algorithm is for example described in Schnars et al. ("Digital recording and numerical reconstruction of holograms" Meas. Sci. Technol. 13 R85-R101 (2002)). Such an algorithm makes it possible to calculate, from a first phase and intensity image determined in a first plane, a second phase and intensity image in a second plane separated from the first plane by a given propagation distance. The propagation algorithm may be applied to the entirety of the image that it is being sought to "propagate" or to one zone of the image, thereby making it possible to increase acquisition speed. This zone of the image may be laterally fixed or mobile in order to remain centered on a zone of interest of the image by virtue for example of an image tracking algorithm.

It may be seen in FIGS. 5A and 5B that the experimental curves (51, 53) and the curves calculated by means of the propagation algorithm (curves 52, 54) are similar. Thus, the same curve of variation in phase or in intensity is obtained if a series of measurements of the electromagnetic field are taken at one point of the field while varying the axial position of the reference object or if a single measurement of intensity and phase is taken in a given plane and the numerical propagation algorithm applied. It thus appears possible to estimate the axial movement of the reference object with a single measurement.

It moreover appears that the nature of the reference object modifies the form of the electromagnetic field as a result of the interactions involved.

The Applicants have demonstrated that the results presented above with a metal particle are also obtainable with a reference object made of a dielectric, preferably an object having a large index difference with the reference medium with which it makes contact, for example a particle made of a high-index dielectric. This index difference is typically larger than or equal to 0.1 and advantageously larger than or equal to 0.5.

Figure 6A:
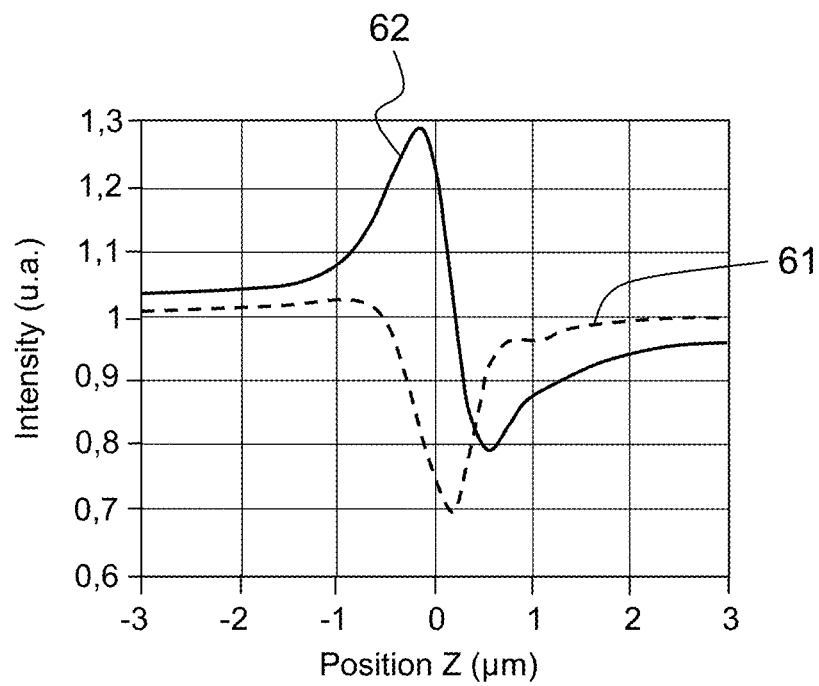
FIGS. 6A and 6B, examples of graphs, obtained numerically, respectively representing the intensity and phase of an electromagnetic field resulting from the interaction between an incident wave and the reference object, as a function of the axial position of the reference object, for a reference object made of metal and for a reference object made of dielectric.
Figure 6B:
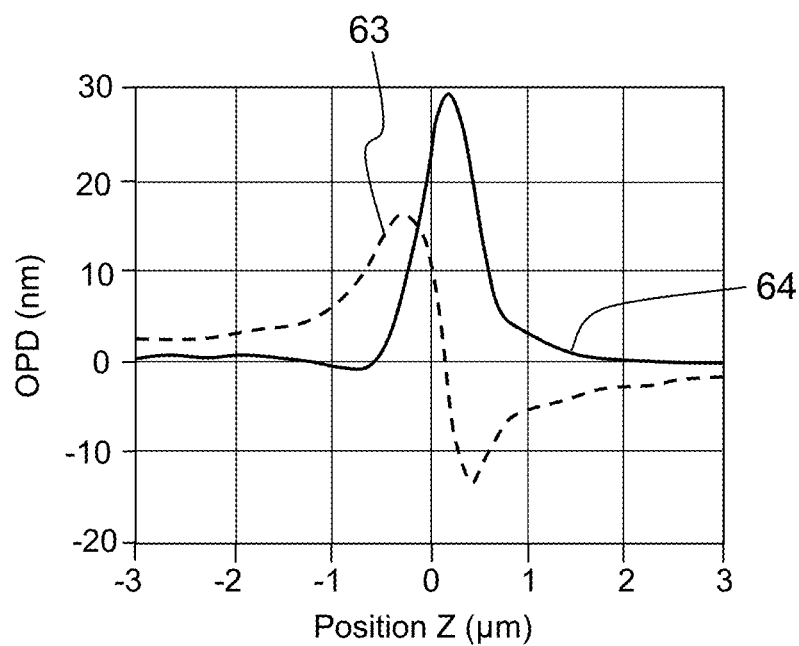

Thus, FIGS. 6A and 6B show the result of the numerical propagation algorithm described above applied to calculate the intensity and phase at the center of the field as a function of the axial position of the reference object for a reference object formed from a metal (curves 61 and 63), and a reference object formed from a dielectric (curves 62 and 64). The metal reference object is as above a particle made of gold of 150 nm diameter and the dielectric reference object is a particle made of polystyrene of 300 nm diameter. The illuminating wavelength is 670 nm.

It may be seen in the figures that in the case of a metal particle, the dependence of the intensity on the position z is an even function (curve 61) and the dependence of the phase on the position z is an uneven function (curve 63) whereas in the case of a nanoparticle made of a dielectric, the dependence of the intensity on the position z is an uneven function (curve 62) and the dependence of the phase on the position Z is an even function (curve 64). This difference in behavior is explainable by the preponderance of the real or imaginary part of the complex refractive index of the reference object. The real part of the index acts on the phase of the wave and the imaginary part affects the intensity of the wave. Thus a particle of high real index (case of the dielectric particle) has a strong phase signature under imaging conditions (the value of the OPD is maximum at z=0) and the signature falls away on either side of the imaging plane (even behavior). In contrast, in intensity the signature is weak under imaging conditions (the value of the intensity is almost zero at z=0). For a particle of high imaginary index (case of the metal particle) the intensity behavior (the value of the intensity is minimal at z=0) and phase behavior (the value of the OPD is almost zero at z=0) are reversed.

The analysis of the phase and intensity images thus produced allows a rapid and extremely precise method for three-dimensional focusing in a microscope to be developed.

Specifically, it is possible, by acquiring an image, or a series of N averaged images to obtain a better precision, to determine the axial movement and the direction of movement of a reference object united with the specimen holder and to deduce therefrom the relative movement to be generated between the microscope objective and the specimen holder to obtain for example an autofocus that compensates for drifts due for example to temperature variations or to vibrations.

According to one embodiment of implementation of the method, from an image or a series of images acquired in a given measurement plane, the best axial focal plane is determined using an electromagnetic field numerical propagation algorithm, for example the algorithm described above. The variation in the axial movement and the movement direction are then deduced therefrom. The lateral variation in the reference object may be measured in the initial images or in the reconstructed images after propagation. In particular, the measurement of lateral movement will be more precise in the reconstructed image corresponding to the image obtained when the reference object is in the focal plane.

According to one embodiment of the invention, recourse may be had to a calibration of the device for three-dimensional focusing.

For example, the calibration may comprise the recording of charts such as illustrated in FIGS. 5A and 5B.

The calibration may be theoretical, by assuming known the emission source, the (size and index of) the reference medium and the reference object. The theoretical calibration then comprises simulating the propagation of the electromagnetic field resulting from the interaction of the incident wave and the reference object for various positions of the reference object and establishing charts by determining, at one point of the field, the value of the phase and intensity. Advantageously, the calibration is done by measuring the phase and intensity at the center of the field, for example corresponding to the center of a particle forming the reference object. The uneven curve, either in phase or in intensity, allows with one measurement point the value and direction of the axial movement to be determined.

With such a calibration, during the implementation of the method for three-dimensional focusing, it is thus enough to acquire an image or a series of images in a single measurement plane to know very precisely the value and the direction of the axial variation of the reference object, the lateral variation being determinable in the phase or intensity image and advantageously on the even curve. Alternatively, since the axial movement is known, it is possible to send a command to generate a relative movement of the microscope objective and the specimen holder to position the reference object in the focal plane and then to very precisely measure the lateral movement in the new acquired image. Alternatively, since the axial movement is known, it is possible to calculate the image at the focal position using the propagation algorithm to measure the lateral movement in the image thus reconstructed.

According to one embodiment, the calibration may be experimental and based on at least one reference-object image acquired beforehand. Thus, the reference object or the microscope objective or even the detector is moved axially and, for each movement value, a phase and intensity image or series of images is acquired. Charts such as illustrated for example in FIGS. 5A and 5B in the case of a metal particle are then deduced therefrom. Alternatively, the calibration may be obtained with a single acquisition of phase and intensity images in a given plane then the charts are obtained by propagating the electromagnetic field and reconstructing the images in the various planes.

The sensitivity of the method for three-dimensional focusing depends on the interaction between the incident wave and the reference object. It is for example possible to express it in terms of the intensity-variation or phase-variation amplitudes ΔI or ΔΦ such as illustrated in FIGS. 5A and 5B for example.

Figure 7A:
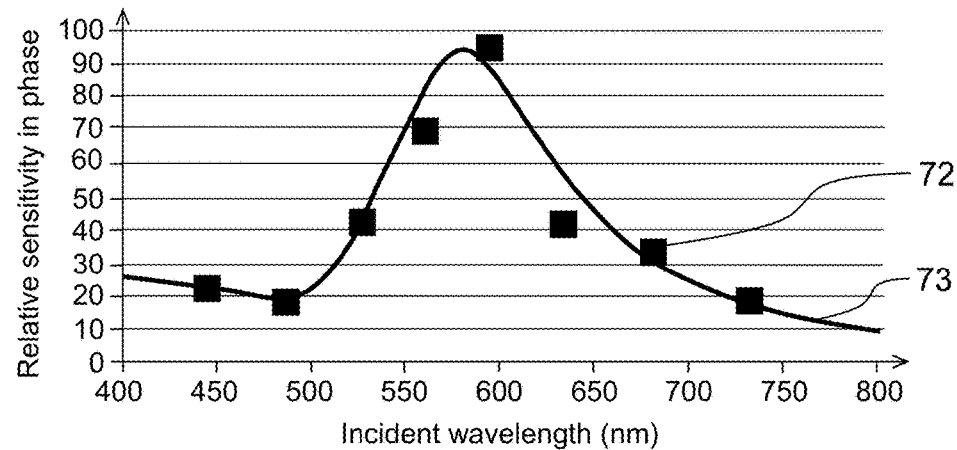
FIGS. 7A and 7B, examples of graphs respectively showing the relative sensitivity in phase and intensity as a function of the wavelength illuminating the reference object.
Figure 7B:
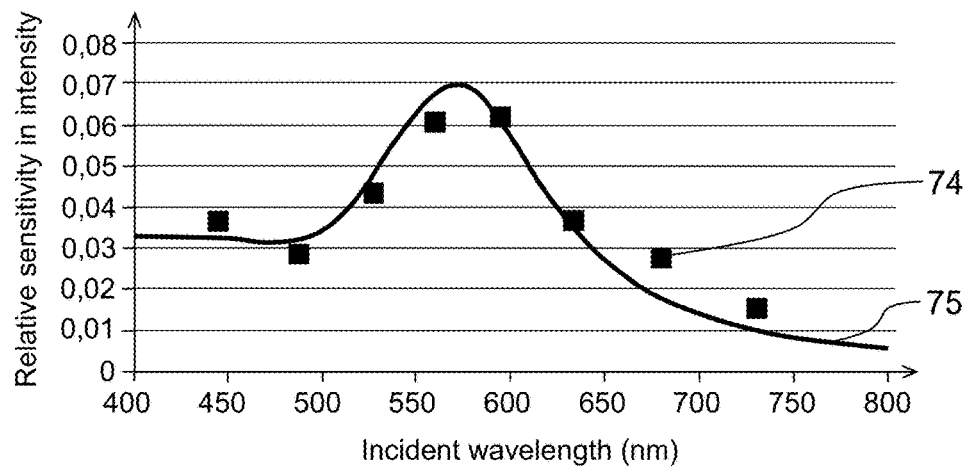

By way of example, FIGS. 7A and 7B show the signal-variation amplitude measured respectively in intensity and in phase as a function of the observation wavelength for a gold particle of 100 nm diameter. The signal variation is expressed in relative sensitivity, meaning that the values are in arbitrary units. The experimental results are represented by square points (curves 71 and 72 for the phase and intensity sensitivity, respectively) and are compared to a theoretical curve showing the effective scattering cross section of the nanoparticle calculated according to Mie theory.

It may be seen from these curves that the sensitivity is dependent on wavelength. This dependence is explained by the plasmonic resonance effects that occur in metal particles for particular ratios of the size of the particle to the illuminating wavelength. In this example, the signal is maximized using an illuminating wavelength of 600 nm for a gold particle of 100 nm diameter. Thus, in the case of use of a reference object comprising metal particles, it will be advantageous, for the device for three-dimensional focusing, to choose a specific source of suitable wavelength.

The method thus described may operate continuously or with interruptions at given moments or moments chosen by the user.

The Applicants have shown that the method for three-dimensional focusing according to the present description allows autofocuses to be obtained in a short space of time, typically about 10 ms, and with a very good precision. The time taken to obtain a focus depends both on the acquisition speed of the detector (typically about 60 images per second for a whole image) and on the sensitivity of the detector: the higher the sensitivity of the detector, the less the number of images to be averaged needs to be high.

Figure 8:
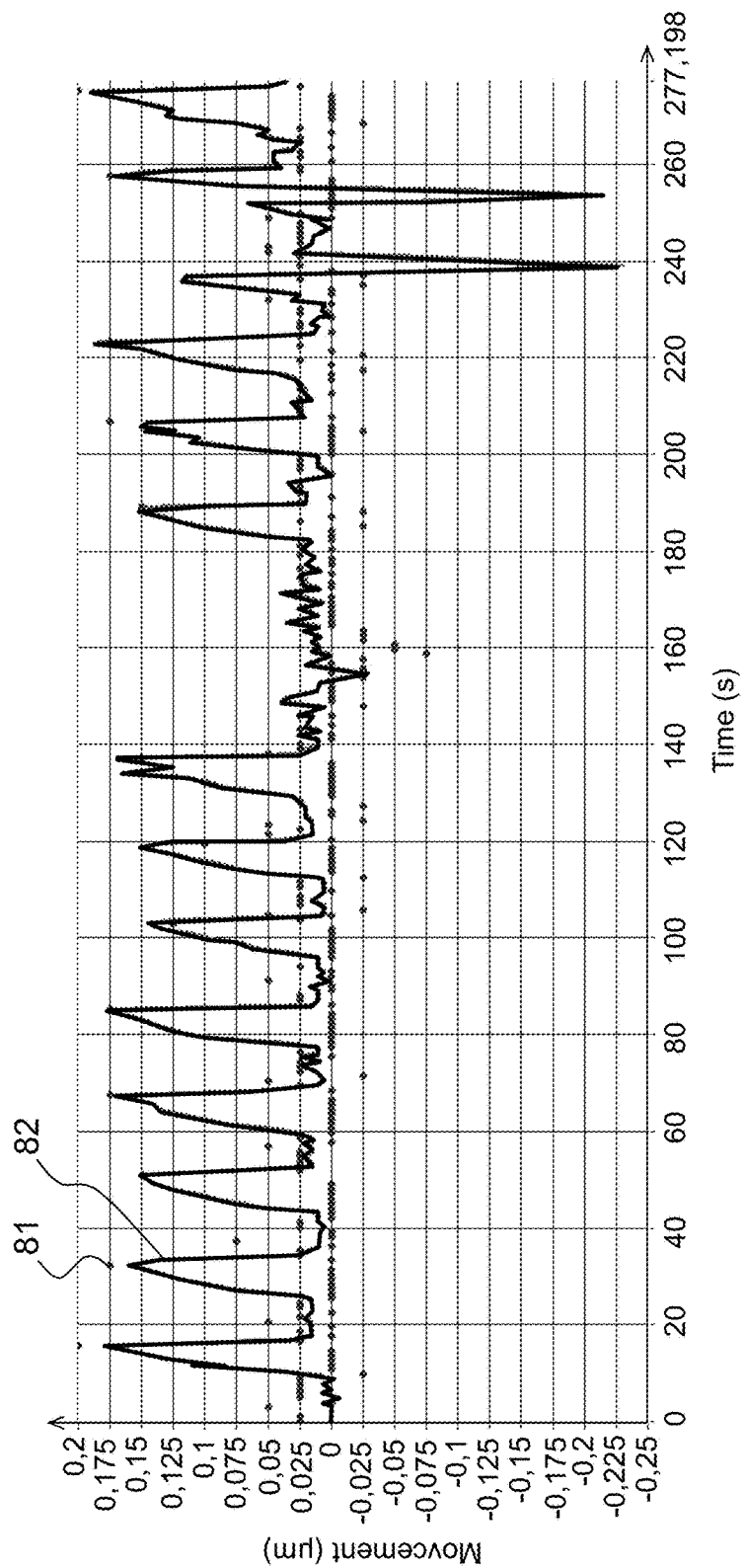
FIG. 8, a graph showing the movement required for focus calculated by means of a standard autofocus system and calculated by an exemplary device according to the present description.

FIG. 8 thus illustrates the comparison of an autofocus obtained by means of the present description (curve 82) and an autofocus obtained in a standard commercially available microscope (curve 81). Curve 81 is obtained with a Nikon-Ti® microscope equipped with a commercially available axial focusing system of the "perfect focus system" type such as described in Zemek et al. ("CRISP nearly eliminates microscopy focus drift", LASER FOCUS WORLD, 48(9), 9-10, 2012). Curve 82 is obtained with an autofocus implemented by means of the method according to the present description, in which, under illumination in transmission, a reference object that is a gold particle of 100 nm diameter is observed illuminated by a wavelength of 670 nm. A single calibration is performed at time t=0 s.

These two curves demonstrate the feasibility of the method according to the present description, which moreover has a very good temporal resolution.

The method for three-dimensional focusing described in the present description may be used, in a microscope, to carry out automatic focusing in real time or at certain moments of an experiment. Alternatively, the method may also be used to control the positioning of a sample. Under these conditions, the measurement serves as a feedback loop to precisely control the position of the sample in the case where the movement system does not move in the way that would theoretically be expected.

Although described by way of a certain number of detailed exemplary embodiments, the device for three-dimensional focusing according to the invention comprises various embodiments, modifications and improvements that will appear obvious to those skilled in the art, and it will be understood that these various embodiments, modifications and improvements form part of the scope of the invention such as defined by the following claims.

The invention claimed is:

1. A device for three-dimensional focusing in a microscope of given resolution, comprising:
   a detector that detects, in a given measurement plane, a phase and intensity image of an electromagnetic field resulting from the interaction of an incident light wave with a reference object located in a reference medium of given refractive index,
   wherein a real part and/or an imaginary part of a complex refractive index of the reference object is different, respectively, from a real part and/or an imaginary part of the refractive index of the reference medium; and a processor that determines, from at least one phase and intensity image, a variation in the three-dimensional position of the reference object.

2. The device as claimed in claim 1, further comprising a source for emitting the incident light wave.

3. The device as claimed in claim 1, wherein the dimensions of the reference object are between 0.1 and 2 times the resolution of the microscope.

4. The device as claimed in claim 1, wherein the index difference between the reference object and the reference medium is larger than or equal to 0.1.

5. The device as claimed in claim 1, further comprising said reference object, said reference object being positioned in the reference medium of given refractive index, wherein the real part and/or imaginary part of the complex refractive index of the reference object is different, respectively, from the real part and/or imaginary part of the refractive index of the reference medium.

6. The device as claimed in claim 5, wherein the reference object comprises a metal particle.

7. The device as claimed in claim 5, wherein the reference object comprises a dielectric particle.

8. The device as claimed in claim 1, wherein the phase and intensity detector comprises a modified Hartmann mask.

9. A microscope comprising:
a specimen holder;
a source for emitting an illuminating beam;
a microscope objective;
a device for three-dimensional focusing; and
means for moving relatively the specimen holder and the microscope objective in three dimensions,
wherein the device comprises:
a detector that detects, in a given measurement plane, a phase and intensity image of an electromagnetic field resulting from the interaction of the illuminating beam with a reference object located in a reference medium of given refractive index,
wherein a real part and/or an imaginary part of a complex refractive index of the reference object is different, respectively, from a real part and/or an imaginary part of the refractive index of the reference medium; and
a processor that determines, from at least one phase and intensity image, a variation in the three-dimensional position of the reference object.

10. The microscope as claimed in claim 9, further comprising controlling means for transmitting to the moving means of the microscope the calculated variation in the three-dimensional position of the reference object.

11. A method for three-dimensional focusing in a microscope, comprising:
choosing at least one reference object in a reference medium of given refractive index, said reference object being secured to a specimen holder, wherein a real part and/or an imaginary part of a complex refractive index of the reference object is different, respectively, from a real part and/or an imaginary part of the refractive index of said reference medium;
illuminating the reference object with an incident light wave;
acquiring a phase and intensity image, in a given measurement plane, of an electromagnetic field resulting from the interaction of the incident wave with the reference object; and
determining, from at least one phase and intensity image, a variation in the three-dimensional position of the reference object.

12. The method for three-dimensional focusing in a microscope as claimed in claim 11, wherein the reference object forms part of a specimen held by the specimen holder.

13. The method for three-dimensional focusing in a microscope as claimed in claim 11, wherein the reference object is external to specimen held by the specimen holder and the method comprises positioning the reference object in the reference medium.

14. The method for three-dimensional focusing in a microscope as claimed in claim 11, further comprising:
a prior calibrating step, the calibrating step comprising determining, for a series of axial positions of the reference object, the intensity and phase of the electromagnetic field resulting from the interaction of the incident wave with the reference object at a given point of the measurement plane.

15. The method for three-dimensional focusing in a microscope as claimed in claim 14, wherein the calibrating step comprises acquiring at least one phase and intensity image of the electromagnetic field resulting from the interaction of the incident wave with the reference object for one axial position of the reference object and calculating phase and intensity images for various axial positions of the reference object, said images being obtained from the measured phase and intensity image using a propagation algorithm.

16. The method for three-dimensional focusing in a microscope as claimed in claim 11, further comprising:
transmitting to the microscope the calculated variation in the three-dimensional position of the reference object.

* * * * *